No. 610,800. Patented Sept. 13, 1898.
W. H. CLOUD.
BATH TRAP.
(Application filed Dec. 21, 1897.)
(No Model.)

Witnesses:
Will. A. Barr.
F. E. Bechtold

Inventor:
William H. Cloud
by his Attorneys
Howson & Howson

UNITED STATES PATENT OFFICE.

WILLIAM H. CLOUD, OF HADDONFIELD, NEW JERSEY.

BATH-TRAP.

SPECIFICATION forming part of Letters Patent No. 610,800, dated September 13, 1898.

Application filed December 21, 1897. Serial No. 662,844. (No model.)

*To all whom it may concern:*

Be it known that I, WILLIAM H. CLOUD, a citizen of the United States, and a resident of Haddonfield, Camden county, New Jersey, have invented certain Improvements in Bath-Traps, of which the following is a specification.

My invention relates to certain improvements in bath-traps adapted to be placed under the floor of a bath-room, with the cleanout opening on a level with the floor, so that access can be had from the top to the interior of the trap.

The object of my invention is to so construct a trap of this type that it will take up very little room between the floor and the ceiling of the room below and to arrange the inlet and outlet of the trap on the same horizontal plane and to flood the outlet-pipe from the end where it leaves the bath-tub to the trap, thus making an extended water seal.

Figure 1:
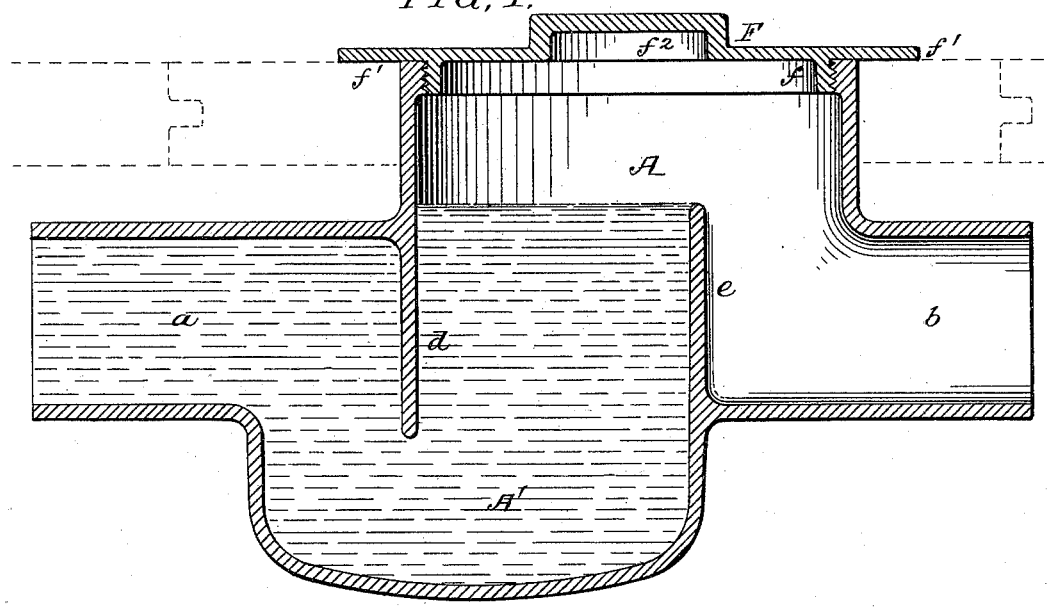
Figure 2:
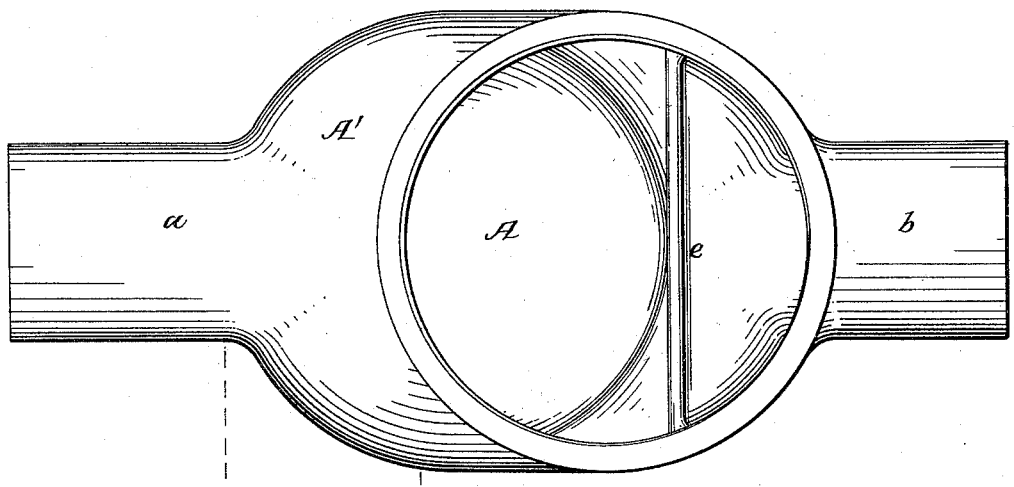

In the accompanying drawings, Figure 1 is a sectional view of my improved bath-trap, and Fig. 2 is a plan view with the cap removed.

A is the upper body portion of the trap, having a lateral offset bottom or lower body portion A', and extending from one side of the trap is the inlet-pipe $a$, and extending from the opposite side of the trap is the outlet-pipe $b$. These two pipes are on the same horizontal plane and in the present instance are shown opposite each other; but in some instances one may enter the body of the trap at right angles to the other, as shown by dotted lines in Fig. 2. The inlet and outlet pipes are sufficiently below the floor so that a proper coupling or joint can be made with the waste-pipes leading from the bath-tub to the trap and from the trap to the main waste-pipe.

$d$ is a deflecting-plate extending across the mouth of the inlet-pipe. This plate extends down preferably to the bottom of the pipe, so as to deflect the water in its passage through the trap, and $e$ is a dam extending across the mouth of the outlet-pipe and to a sufficient distance away from the casing to allow the water to freely escape over the dam and through the outlet-pipe. This dam extends above the top of the inlet-pipe, so that the level of the water in the trap is above the inlet-pipe, thus keeping the inlet-pipe flooded at all times, and if the waste-pipe from the bath-tub to the trap is on a level with this inlet-pipe it will also be flooded, making an extended water seal. It will be observed that the lower body or bottom portion A' projects below the inlet and outlet pipes and is laterally offset in the direction of the inlet-pipe with respect to the deflecting-plate $d$, so that a portion of the bottom extends under the top of the inlet-pipe $a$. By extending the dam $e$ up to the point illustrated I make a trap much less in depth than the bath-traps now on the market, at the same time keeping the depth of water required by law.

Bath-traps are often placed in portions of buildings where there is very little space between the ceiling of the room below and the floor of the bath-room. Consequently it is a great advantage to have a trap that takes up very little room in depth, and my improved trap having the inlets and outlets at a point directly below the floor-line makes it possible to unite the inlets and outlets of the trap to waste-pipes without cutting away the joists to any great extent, and by having the inlets on a line the castings can be readily chucked for the purpose of finishing in a lathe when required.

The body portion A of the trap is opened its entire diameter and has a screw-thread at its upper edge.

F is a cap having a screw-threaded portion $f$, adapted to the screw-threaded portion of the casing, and this cap has an extended flange $f'$, so as to completely hide the opening in the floor, and has a many-sided head $f^2$, adapted to receive a wrench.

The trap made as shown can be readily cleansed from above and thoroughly scoured. In some instances when the trap is to be fitted in a corner it may be made with the inlet and the outlet pipes arranged at right angles, as shown by dotted lines in Fig. 2, without departing from my invention.

I claim as my invention—

1. The combination in a bath-trap, of an upper body portion having inlet and outlet pipes on or about the same horizontal plane, a deflecting-plate in front of the inlet-pipe, a bottom portion projecting below said pipes and laterally offset, in the direction of the inlet-pipe, with respect to said deflecting-plate so that a portion of the bottom extends beyond the deflecting-plate and under the top of the inlet-pipe, and a dam in front of the outlet-pipe, substantially as described.

2. The combination in a bath-trap, of a body portion having inlet and outlet pipes on or about the same horizontal plane, a deflecting-plate extending downwardly from said top portion in front of the inlet-pipe, the lower body portion projecting below the said pipes and laterally offset, in the direction of the inlet-pipe, with respect to said deflecting-plate so that a portion of the bottom extends beyond the deflecting-plate and under the top of the inlet-pipe, and a dam extending in front of the outlet-pipe above the top of the inlet-pipe, substantially as described.

3. The combination in a bath-trap, of an upper body portion having inlet and outlet pipes on or about the same horizontal plane, a deflecting-plate in front of the inlet-pipe, a bottom portion projecting below said pipes and laterally offset, in the direction of the inlet-pipe, with respect to said deflecting-plate so that a portion of the bottom extends beyond the deflecting-plate and under the top of the inlet-pipe, a dam in front of the outlet-pipe, and a cap removably secured to the upper body portion, substantially as described.

In testimony whereof I have signed my name to this specification in the presence of two subscribing witnesses.

WILLIAM H. CLOUD.

Witnesses:
   WILL. A. BARR,
   JOS. H. KLEIN.